Patented Mar. 31, 1942

2,277,747

UNITED STATES PATENT OFFICE 2,277,747

ARTIFICIAL TEXTILE MATERIALS, ETC.

Henry Dreyfus, London, England, assignor to Celanese Corporation of America, a corporation of Delaware No Drawing. Application February 26, 1938, Serial No. 192,786. In Great Britain March 15, 1937

12 Claims. (Cl. 91—70)

This invention relates to the manufacture of filaments, yarns, ribbons, fabrics, films, foils and the like materials having a basis of cellulose acetate or other derivative of cellulose, and is especially concerned with the production of materials of this kind of improved resiliency.

The resiliency of cellulosic textile materials can readily be enhanced and the materials be rendered resistant to creasing by forming a water-insoluble resinous substance in the materials. To obtain similar effects on materials of cellulose acetate or other cellulose derivative has, however, presented a problem of great difficulty and it is only by very special methods that any such effect on materials of this kind has been obtained. It is the primary object of the present invention to facilitate the production of resilient cellulose derivative textile materials, films and foils of enhanced resistance to creasing.

The invention involves the use of cellulose derivative materials which contain a substantial amount of a plasticiser or other substance which can be removed from the materials, preferably by the action of a solvent having a swelling action on the materials. The materials are treated to remove or substantially reduce the plasticiser content and are simultaneously or immediately thereafter impregnated with a solution adapted to introduce a substance or substances capable of subsequent conversion in the materials, and under the influence of heat, to a water-insoluble resinous condensation product.

Among plasticisers which can be used with cellulose acetate the following may be mentioned: neutral aliphatic phthalates such as dimethyl phthalate, diethyl phthalate, dibutyl phthalate, di-oxyethyl phthalate, di-methoxyethyl phthalate and di-ethoxyethyl phthalate, benzyl acetate, ethyl-oxy-butyrate, diacetin, triacetin, tribenzoyl glycerin, triphenyl and tricresyl phosphates, dimethyl-, diethyl-, and dibutyl tartrates. Alcohol-soluble substances which, while compatible with the cellulose acetate or other cellulose derivative are not normally regarded as plasticisers, e. g. ethyl lactate, diacetone alcohol and like high boiling solvents, lactic and citric acids, and the alcohol and acetone soluble fractions of natural resins such as rosin, shellac and kauri, may also be used. Indeed, any substance may be used which is soluble in the volatile solvent of the spinning solution (assuming the products are made by dry spinning), of sufficiently high boiling point not to be removed during spinning, and readily removable therefrom, preferably by treatment with a liquid capable of swelling but not of dissolving the materials.

The invention includes making the materials by wet spinning processes. In this case the plasticiser or the like must be of such limited solubility in the coagulating bath as not to be removed during spinning.

The plasticiser or other substance introduced with a view to subsequent removal from the materials should be present to the extent of at least 10% on the weight of the materials and preferably 15 or 20 to 25 or 30%. Even higher proportions can be used with advantage, e. g. 40 to 50% or more.

The best results have been obtained by using methanol as the agent for swelling the material and/or removing the plasticisers or the like but other non-aqueous swelling agents of high penetrative power may be used. Such agents are characterised by the presence of active groups such as hydroxyl, carbonyl or carboxy groups and by simplicity of structure and high volatility. Examples of suitable agents where the cellulose derivative is cellulose acetate are ethanol, methyl formate, methyl acetate, methylal and ethylal. As indicated below, formaldehyde or other resin-forming aldehydes may be present in the bath and may play a part in swelling the cellulose derivative and dissolving out the plasticiser. Naturally the swelling medium must not be a true solvent for the materials. Liquids which are true solvents may, however, be employed in the swelling medium in conjunction with suitable non-aqueous diluents, e. g. ether or benzene. In using such diluents, however, due regard must be had to the possibility of unduly decreasing the penetrative power of the medium and/or its solvent power for the resin-forming substance or substances and for the plasticiser or the like.

The greater the extent to which water is removed from the materials treated, the more readily is the resiliency of the material increased. Exclusion of water from the materials is facilitated by the used, in swelling, in removing the plasticiser and in introducing the resin-forming substance or substances, of non-aqueous liquids such as methanol.

Although the use of non-aqueous swelling agents is to be preferred, the invention is not limited thereto and includes the use in removing the plasticiser and in introducing the resin-forming components, as such or in the form of intermediate reaction products, of aqueous swelling agents. As examples of such swelling agents mention may be made of aqueous solutions of acetone, methyl ethyl ketone and dioxane. These substances should be used in the form of solutions of such concentration as to have a strong swelling effect on the material without dissolving it. Methanol and ethanol may also be employed in aqueous solution, for example 80 to 90% solution. When a water-soluble plasticiser is used removal may be effected by treatment in an aqueous bath in the presence or absence of swelling agents for the materials.

The removal of the plasticiser or the lie may be effected as a step separate from, and carried out immediately before, the application of the resin-forming substance or substances. For example the materials may be treated in a bath of methanol or other suitable swelling agent to remove the plasticiser and immediately thereafter passed into another bath containing the resin-forming substances or substances in solution in the swelling agent.

The resin-forming substance with which the materials are impregnated is preferably applied in the form of an intermediate reaction product of the resin-forming components, said product being of sufficiently low molecular weight to be readily soluble in the swelling agent employed. Water solubility is a useful criterion of a sufficiently low molecular weight for the intermediate product to enter readily into the materials treated. Di-methylol urea is an example of an intermediate condensation product which can be used with advantage. Instead of such an intermediate product the resin-forming components (in this case urea and formaldehyde) may be applied separately, or together without reaction. Thus, for example, urea dissolved in methanol or other suitable swelling agent may first be applied to the materials under such conditions that the plasticiser is removed at least in part, and the materials may then be treated immediately with a solution of formaldehyde in methanol. Or a methanol solution containing both formaldehyde and urea may be applied to the materials but without any heating step to cause the urea and formaldehyde to react. Since formaldehyde itself has a high solvent power for cellulose acetate, it should not be applied power for cellulose acetate, it should not be applied in a very high concentration. Concentrations of 5 to 15%, e. g., 8 to 10% formaldehyde in a methanol are generally preferable; concentrations higher than about 18% are apt to swell the material unduly. The urea and formaldehyde may with advantage be employed in substantially equal molecular proportions but the proportions may be varied from equality in both directions. Very satisfactory results have been obtained using about 3 molecular proportions of urea to 2 of formaldehyde. Although it is preferable to apply the urea and formaldehyde in the form of an intermediate reaction product under acid conditions and to maintain the acidity during the final heating to form the desired insoluble reaction product, the application and the insolubilisation may be effected under alkaline conditions. Instead of urea and formaldehyde other synthetic resin components can be used. Thus for example formaldehyde can be replaced by other resin-forming aldehydes, for instance acetaldehyde, benzaldehyde, furfural or acrolein and urea by thiourea, dicyandiamide, guanidine or like acting bases, e. g. biuret and mono-methyl urea and mono-ethyl urea. By the use of the appropriate components or intermediate products thereof water-insoluble resinous condensation products of, for example, the diphenylol-propane formaldehyde type can be formed in the materials.

The condensation or polymerisation is, as indicated above, effected by the application of heat to the materials containing the resin-forming substance or substances. This may be effected by passing the material through a heated atmosphere or over heated rolls. A very convenient apparatus for this purpose is one similar to the agers used in dyeing but provided with means for obtaining a higher temperature than is usually reached in such machines.

It is important to remove or prevent the formation of a coating of the water-insoluble reaction product on the outside of the materials. This may be done in various ways. After the drying step preparatory to the final heating the materials may be subjected to a brushing, beating or other mechanical treatment adapted to remove any of the intermediate reaction product adhering to the outside of the materials, for instance the methods of U. S. application S. No. 173,871 filed November 10, 1937, may be adopted. Similar methods may be employed after the final heating; or the materials may be scoured with a mildly alkaline solution adapted to remove the insoluble reaction product from the outside of the materials without penetrating to the interior or damaging the materials.

The following examples illustrate the invention.

*Example 1*

Cellulose acetate yarn is made by dry spinning a solution of cellulose acetate in acetone containing 15 to 25% on the weight of the cellulose acetate of dimethyl phthalate. The yarn is woven into a fabric and this is then soaked in a substantially anhydrous solution of a reaction product of urea and formaldehyde in methanol, the solution being prepared as follows:

40 parts by weight of urea and 160 parts by weight of an 11% solution of formaldehyde in methanol are mixed and brought to a pH of about 8 by the addition of caustic potash dissolved in methanol. The resulting solution is heated at 60 to 70° C. for a few minutes and then cooled rapidly. Acetic anhydride is added to bring the solution to a pH of about 5. The solution is then allowed to stand for some hours. Before use the solution is acidified by the addition of 1 to 2% of concentrated sulphuric acid.

The fabric is immersed in the bath prepared as described above for 20 to 30 minutes after which it is removed and dried in air at ordinary temperature. It is then heated at 180 to 200° C. for about 5 minutes. Finally, any synthetic resin formed on the outside of the fabric is removed by passing it through a fabric breaker.

*Example 2*

The process is carried out as described in Example 1, but forming the condensation product in an 80% aqueous solution of methanol instead of in anhydrous methanol, the pH value being adjusted first before heating by the addition of aqueous caustic soda and secondly after the heating and cooling step by the addition of acetic acid.

In a similar way the process can be carried out using an aqueous solution of a preliminary condensation product of urea and formaldehyde for example dimethylol urea and employing a water-soluble plasticiser for example diacetin.

The invention is of special importance in connection with the manufacture of textile materials having a basis of cellulose acetate and has been described herein with reference to the treatment of such materials. The process of the invention is also applicable, however, to other materials including films, foils and ribbons, having a basis of organic esters or ethers of cellulose, for example organic esters such as cellulose formate, propionate and butyrate, mixed organic and inorganic esters such as cellulose nitrate acetate, cellulose acetate propionate, cellulose acetate propionate butyrate and cellulose nitrate acetate propionate, simple ethers such as ethyl-, methyl-, propyl-, and benzyl-celluloses and ether-esters such as ethyl cellulose acetate and oxy-ethyl cellulose acetate. The invention is not limited to the use of esters or ethers of any particular ether or ester content. Thus, in the case of organic esters of cellulose, the acidyl value may range from less than that corresponding to a mono-ester to that corresponding to a tri-ester. In the case of lower organic esters of cellulose, however, the most useful results have been obtained with esters of acidyl content ranging from 1 to 2½ acidyl groups per $C_6H_{10}O_5$ unit.

One of the most useful applications of the process of the invention is in the manufacture of fabrics of organic derivatives of cellulose. By the process of the invention fabrics having a high resistance to creasing may be made. Effects such as embossing produced by mechanical treatment are more permanent, and the affinity of the fabrics for acid dyes and the resistance to water are greater in the case of fabrics made according to the invention than for ordinary cellulose derivative fabrics. The effects produced may extend over the whole fabric or may be local, localisation of the effect being produced for example by localising the polymerisation or condensation. Similar effects may be produced on films, ribbons and yarns. Thus, for example, the invention includes effecting the polymerisation after or in the course of a process designed to produce crimped threads for example by imparting false twist to the running threads, or during a process for producing crinkled ribbons or films.

Having described my invention what I desire to secure by Letters Patent is:

1. Process for the production of artificial materials of improved resilience, which comprises dissolving out of materials comprising filaments, ribbons or the like of a stable organic derivative of cellulose, a substance contained in said materials and soluble in a non-solvent for the cellulose derivative, by treating the materials in a bath containing said non-solvent, impregnating materials, in the same bath, with synthetic resin-forming matter, and subsequently heating the materials to convert said resin-forming matter into a water-insoluble synthetic resin.

2. Process for the production of artificial materials of improved resilience, which comprises dissolving out of materials comprising filaments, ribbons or the like of a stable organic derivative of cellulose, a substance contained in said materials and soluble in a non-solvent for the cellulose derivative, said non-solvent having a swelling action on the cellulose derivative, by treating the materials in a bath containing said non-solvent, impregnating the materials, in the same bath, with synthetic resin-forming matter, and subsequently heating the materials to convert said resin-forming matter into a water-insoluble synthetic resin.

3. Process for the production of artificial materials of improved resilience, which comprises dissolving out of materials comprising filaments, ribbons or the like of stable organic derivative of cellulose, a plasticizer contained in said materials and soluble in a lower aliphatic alcohol, by treating the materials in a bath containing said alcohol, impregnating the materials, in the same bath, with synthetic resin-forming matter and subsequently heating the materials to convert said resin-forming matter into a water-insoluble synthetic resin.

4. Process for the production of artificial materials of improved resilience, which comprises dissolving out of materials comprising filaments, ribbons or the like of cellulose acetate, a substance contained in said materials and soluble in a non-solvent for the cellulose acetate, by treating the materials in a bath containing said non-solvent, impregnating the materials, in the same bath, with synthetic resin-forming matter, and subsequently heating the materials to convert said resin-forming matter into a water-insoluble synthetic resin.

5. Process for the production of artificial materials of improved resilience, which comprises dissolving out of materials comprising filaments, ribbons or the like of cellulose acetate, a substance contained in said materials and soluble in a non-solvent for the cellulose acetate, said non-solvent having a swelling action on the cellulose acetate, by treating the materials in a bath containing said non-solvent, impregnating the materials, in the same bath, with synthetic resin-forming matter, and subsequently heating the materials to convert said resin-forming matter into a water-insoluble synthetic resin.

6. Process for the production of artificial materials of improved resilience, which comprises dissolving out of materials comprising filaments, ribbons or the like of cellulose acetate, a plasticizer contained in said materials and soluble in a lower aliphatic alcohol, by treating the materials in a bath containing said alcohol, impregnating the materials, in the same bath, with synthetic resin-forming matter and subsequently heating the materials to convert said resin-forming matter into a water-insoluble synthetic resin.

7. Process for the production of artificial materials of improved resilience, which comprises dissolving out of materials comprising filaments, ribbons or the like of a stable organic derivative of cellulose, a substance contained in said materials and soluble in a non-solvent for the cellulose derivative, by treating the materials in a bath containing said non-solvent, impregnating the materials, in the same bath, with a water-soluble condensation product of formaldehyde with a base selected from the group consisting of urea, thiourea, dicyandiamide and guanidine, and subsequently heating the materials to convert said condensation product into a water-insoluble synthetic resin.

8. Process for the production of artificial materials of improved resilience, which comprises dissolving out of materials comprising filaments, ribbons or the like of a stable organic derivative of cellulose, a substance contained in said materials and soluble in a non-solvent for the cellulose derivative, said non-solvent having a swelling action on the cellulose derivative, by treating the materials in a bath containing said non-solvent, impregnating the materials, in the same bath, with a water-soluble condensation product of formaldehyde with a base selected from the group consisting of urea, thiourea, dicyandiamide and guanidine, and subsequently heating the materials to convert said condensation product into a water-insoluble synthetic resin.

9. Process for the production of artificial materials of improved resilience, which comprises dissolving out of materials comprising filaments, ribbons or the like of a stable organic derivative of cellulose, a plasticizer contained in said materials and soluble in a lower aliphatic alcohol, by treating the materials in a bath containing said alcohol, impregnating the materials, in the same bath, with a water-soluble condensation product of formaldehyde with a base selected from the group consisting of urea, thiourea, dicyandiamide and guanidine, and subsequently heating the materials to convert said condensation product into a water-insoluble synthetic resin.

10. Process for the production of artificial materials of improved resilience, which comprises dissolving out of materials comprising filaments, ribbons or the like of cellulose acetate, a substance contained in said materials and soluble in a non-solvent for the cellulose acetate, said non-solvent having a swelling action on the cellulose acetate, by treating the materials in a bath containing said non-solvent, impregnating the materials, in the same bath, with a water-soluble condensation product of formaldehyde with a base selected from the group consisting of urea, thiourea, dicyandiamide and guanidine, and subsequently heating the materials to convert said condensation product into a water-insoluble synthetic resin.

11. Process for the production of artificial materials of improved resilience, which comprises dissolving out of materials comprising filaments, ribbons or the like of cellulose acetate, a plasticizer contained in said materials and soluble in a lower aliphatic alcohol, by treating the materials in a bath containing said alcohol, impregnating the materials, in the same bath, with a water-soluble condensation product of formaldehyde with a base selected from the group consisting of urea, thiourea, dicyandiamide and guanidine, and subsequently heating the materials to convert said condensation product into a water-insoluble synthetic resin.

12. Process for the production of artificial materials of improved resilience, which comprises dissolving out of materials comprising filaments, ribbons or the like of cellulose acetate, dimethyl phthalate, by treating the materials in a bath containing methyl alcohol, impregnating the materials, in the same bath, with a water-soluble condensation product of formaldehyde with a base selected from the group consisting of urea, thiourea, dicyandiamide and guanidine, and subsequently heating the materials to convert said condensation product into a water-insoluble synthetic resin.

HENRY DREYFUS.

CERTIFICATE OF CORRECTION.

Patent No. 2,277,747. March 31, 1942.

HENRY DREYFUS.

It is hereby certified that error appears in the printed specification of the above numbered patent requiring correction as follows: Page 2, first column, line 11, for "lie" read --like--; lines 47 and 48, strike out "power for cellulose acetate, it should not be applied"; page 3, second column, line 3, claim 3, before "stable" insert --a--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.